United States Patent
Meganathan et al.

(10) Patent No.: US 10,176,683 B2
(45) Date of Patent: Jan. 8, 2019

(54) VIRTUAL PANORAMIC THUMBNAIL TO SUMMARIZE AND VISUALIZE VIDEO CONTENT IN VIDEO SURVEILLANCE AND IN CONNECTED HOME BUSINESS

(71) Applicant: Honeywell International Inc., Morristown, NJ (US)

(72) Inventors: Deepak Sundar Meganathan, Bangalore (IN); Shankar Prasad H. M., Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 251 days.

(21) Appl. No.: 14/489,680

(22) Filed: Sep. 18, 2014

(65) Prior Publication Data
US 2016/0086462 A1 Mar. 24, 2016

(51) Int. Cl.
| | |
|---|---|
| H04N 7/18 | (2006.01) |
| G08B 13/196 | (2006.01) |
| G11B 27/10 | (2006.01) |
| G11B 27/32 | (2006.01) |
| G11B 27/34 | (2006.01) |
| G06F 17/30 | (2006.01) |
| H04N 5/14 | (2006.01) |

(52) U.S. Cl.
CPC . *G08B 13/19602* (2013.01); *G06F 17/30843* (2013.01); *G11B 27/102* (2013.01); *G11B 27/326* (2013.01); *G11B 27/34* (2013.01); *H04N 5/144* (2013.01); *H04N 7/181* (2013.01); *H04N 7/188* (2013.01)

(58) Field of Classification Search
USPC .......................................................... 348/155
See application file for complete search history.

(56) References Cited

U.S. PATENT DOCUMENTS

| | | | |
|---|---|---|---|
| 7,047,494 B2 | 5/2006 | Wu et al. | |
| 7,502,048 B2* | 3/2009 | Okamoto | B60R 1/00 348/148 |
| 8,013,925 B2* | 9/2011 | Ito | G11B 27/3027 348/333.05 |
| 8,223,153 B2 | 7/2012 | Kim | |
| 8,307,399 B2* | 11/2012 | Lee | H04N 7/17318 715/720 |
| 8,605,151 B2* | 12/2013 | Bellamy | G08B 13/19656 348/143 |

(Continued)

FOREIGN PATENT DOCUMENTS

JP 2011-254289 12/2011

OTHER PUBLICATIONS

Extended European search report from corresponding EP patent application 15185568.1, dated Feb. 16, 2016.

(Continued)

*Primary Examiner* — Leron Beck
(74) *Attorney, Agent, or Firm* — Husch Blackwell LLP

(57) ABSTRACT

A system including a video sequence embodied in memory, a processor that detects a moving object or person within a field of view of the video sequence, a processor that tracks the moving object or person and that identifies a plurality of frames that summarizes movement of the moving object or person within a time interval of the video sequence and a processor that combines the identified plurality of frames into a thumbnail image.

15 Claims, 5 Drawing Sheets

(56) References Cited

U.S. PATENT DOCUMENTS

| | | | | |
|---|---|---|---|---|
| 8,977,980 B2* | 3/2015 | Abe | ............... | G06F 3/0485 |
| | | | | 715/786 |
| 9,646,571 B1* | 5/2017 | Cote | ............... | G09G 5/377 |
| 2001/0015756 A1* | 8/2001 | Wilcock | ........... | G06F 17/30265 |
| | | | | 348/158 |
| 2002/0089587 A1* | 7/2002 | White | ............ | G11B 27/034 |
| | | | | 348/105 |
| 2004/0100563 A1* | 5/2004 | Sablak | ............ | H04N 5/77 |
| | | | | 348/211.4 |
| 2004/0199435 A1* | 10/2004 | Abrams | .......... | G06Q 30/06 |
| | | | | 705/27.2 |
| 2006/0119703 A1* | 6/2006 | Hibi | ............. | H04N 7/181 |
| | | | | 348/143 |
| 2008/0204564 A1* | 8/2008 | Yumiki | .......... | H04N 5/23219 |
| | | | | 348/208.99 |
| 2009/0060271 A1* | 3/2009 | Kim | .............. | H04N 7/181 |
| | | | | 382/103 |
| 2011/0141295 A1* | 6/2011 | Yumiki | .......... | H04N 5/23219 |
| | | | | 348/208.4 |
| 2012/0163657 A1 | 6/2012 | Shellshear | | |
| 2013/0170760 A1 | 7/2013 | Wang et al. | | |
| 2015/0015704 A1* | 1/2015 | Hirasawa | ......... | G06T 7/2093 |
| | | | | 348/143 |

OTHER PUBLICATIONS

English-language translation of abstract for Japanese patent publication JP 2011-254289, dated Dec. 11, 2015.

* cited by examiner

US 10,176,683 B2

VIRTUAL PANORAMIC THUMBNAIL TO SUMMARIZE AND VISUALIZE VIDEO CONTENT IN VIDEO SURVEILLANCE AND IN CONNECTED HOME BUSINESS

FIELD

This application relates to security systems and more particular to surveillance systems.

BACKGROUND

Systems are known to protect people and assets within secured areas. Such systems are typically based upon the use of one more sensors that detect threats within the secured area.

Threats to people and assets may originate from any of number of different sources. For example, an unauthorized intruder, such as a burglar may present a threat to assets within a secured area. Intruders can also injure or kill people living within the area.

Intruders may be detected via switches placed on the doors or windows of a home. Alternatively, the area may be monitored via a number of security cameras.

The video from such cameras may be presented on a display at a guard's station. Alternatively or in addition, the video may be continuously recorded in a video archive by a recording device of the security system.

The recorded video may be used as evidence of criminal activity, such as a break-in or theft. However, the relevant video may only occupy a few frames of many hours of continuous recording.

In the case where the criminal activity is not immediately detected by a sensor of the security system or by a guard monitoring the video, then the video must be reviewed at a later time to identify the relevant portions. This may involve a guard or some other designated person reviewing hours of video from one or more cameras in order to find evidence of the event from one or more cameras.

During the course of an investigation, the reviewer may identify and save the contents of a number of different portions of the video with repetitive and often confusing descriptions. Accordingly, a need exists for better ways of reviewing relevant video.

DETAILED DESCRIPTION

Figure 1:
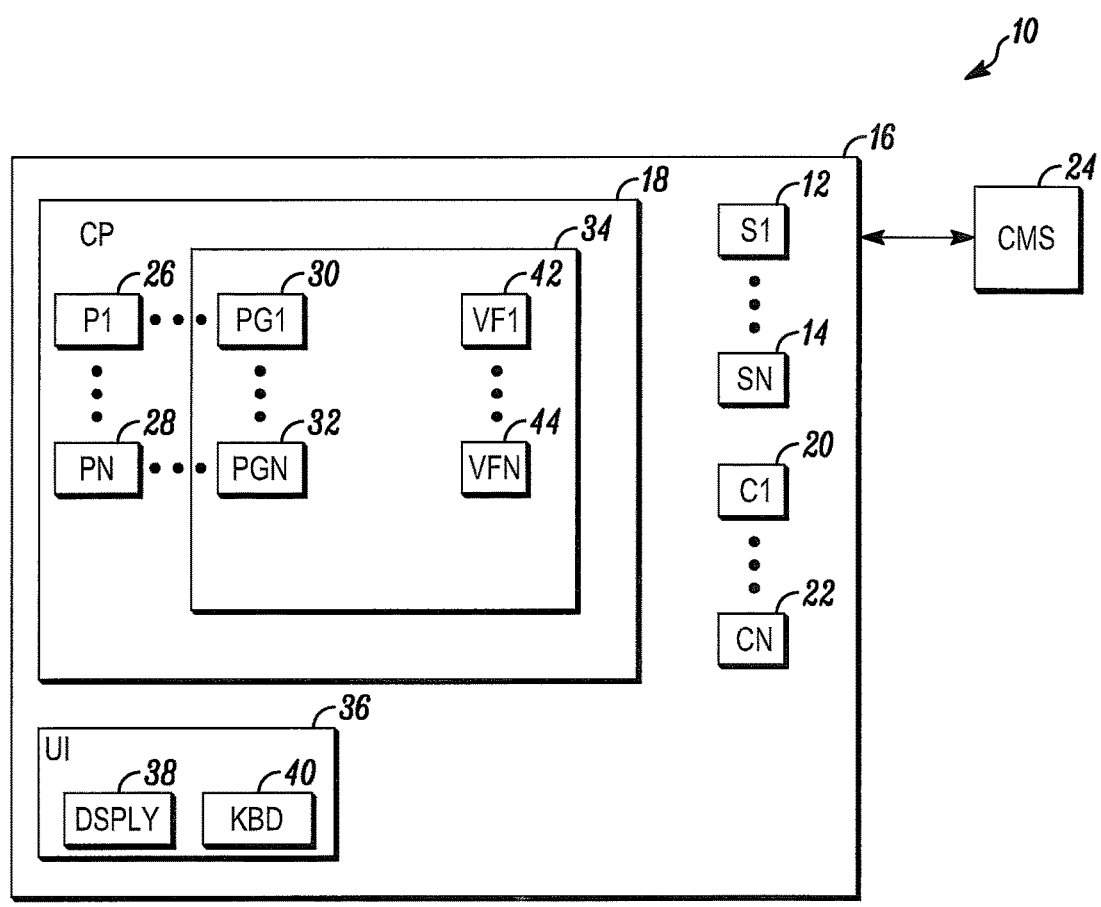
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a security system 10 shown generally in accordance with an illustrated embodiment. Included within the system may be a number of sensors 12, 14 that detect threats within a secured area 16.

Also included within the secured area may be a number of video cameras 20, 22. The cameras may operate continuously or only in response to activation by one of the sensors.

The sensors and cameras may be monitored by a control panel 18. The control panel may be located within the secured area as shown in FIG. 1 or the control panel may be located remotely from the secured area.

The control panel may monitor the sensors and/or cameras for threats within the secured area. Upon detecting a threat, the control panel may compose and send an alarm message to a central monitoring station 24. The central monitoring station may respond by summoning the appropriate help (e.g., police, fire department, etc.).

The control panel and cameras may include one or more process apparatus (processors) 26, 28, each operating under control of one or more computer programs 30, 32 loaded from a non-transitory computer readable medium (memory) 34. As used herein, reference to a step performed by a computer program is also reference to the processor that executed that step.

The secured area may also include a user interface 36. The user interface may be used by a person (e.g. a guard) to monitor the secured area. In this regard, the guard may monitor the cameras via a display 38 on the user interface. The guard may, in turn, select the camera shown on the display via a keyboard 40.

Video from the cameras may be saved into one or more video files 42, 44. The video from each camera may be saved continuously or only upon detection of some event within the secured area. For example, at least some of the sensors may be limit switches placed on the doors and/or windows providing entry into or egress from the secured area. Upon activation of one of the switches, the camera near that door or window may be activated in order to record images of intruders.

Alternatively, video from each of the camera may be processed to detect intruders. In this regard, a motion processor may compare sequences of images from each camera to detect changes that indicate the presence of an intruder. In each case, the detection of an intruder may cause an archiving processor to open a new video file or save video to an existing file.

In some cases, threats may not be directly detected by the security system even where the cameras are continuously active and video from the cameras is saved into memory on a continuous basis. This may be the case where the secured area is normally occupied by authorized persons (e.g., employees of the owner of the secured area). If an intruder is able to circumvent perimeter switches on the doors and/or windows surrounding the secured area, then the intruder may be able to roam the secured area at will, commit various crimes and escape without detection.

If a security event is later detected via damage or some missing asset, then a guard may need to review video from the cameras that had previously been saved during the time period of the event in order to find evidence of the event. However, this may involve reviewing hours or even days of recorded video.

Under the illustrated embodiment, video from each of the cameras is processed to characterize events detected by the cameras. In this regard, a motion processor may operate in the background to detect motion among frames of video from each of the cameras. When motion is detected, the motion processor or some other associated processor may perform a number of steps in order to classify and characterize the event. For example, a first processor may compare the size of the moving object or person detected among frames with a threshold value. This may be important to avoid mischaracterizing normal movement within the secured area such as the moving blades of overhead fans or curtains moving in response to wind blowing through an open window.

The size in this case may be obtained by forming an outline around the moving object or person. The outline may be formed by tracking a boundary around detected changes among sequences of frames.

The speed of the moving object or person may also be determined by an appropriate processor and compared to a threshold value. This may be important to avoid detecting natural phenomenon such as a shadow caused by sunlight as it moves across the floor of a room. The processor may also detect repetitive motion (e.g., the repetitive motion of the blades of a fan) and exclude such events.

If the moving object or person has the appropriate size and motion, then a tracking processor may track the object or person. Tracking may be performed within a field of view of each camera and among cameras. Tracking may be accomplished among cameras by comparing the size and speed of the object or person among cameras and, when a match is found, continuing the tracking process.

A summarizing processor may periodically summarize the tracked movement of the person or object. Summarization in this case means selecting a number of consecutive or nonconsecutive frames that summarizes the activity of the object or person. For example, if a person or object enters the secured area through a first door, walks down a hall to a second door, returns to the first door and finally exits through the second door, then the summarization would include a sequence of frames from when the intruder enters through the first door and finally exits through the second door. The summarization would not include frames of the intruder returning to the first door because this is merely repetitive motion.

Once the frames summarizing the activity have been identified, they may be combined into a thumbnail image. The thumbnail image may be used as a graphic identifier of the video sequence from which the summary was obtained.

The thumbnail images may be formed by combining the plurality of images and reducing the size of the combination to fit within a single frame. The reduction in size may be accomplished via any of a number of different techniques (e.g., deleting every other pixel, deleting every third pixel, etc.).

The claimed system offers a number of advantages over conventional systems. For example, in a conventional video surveillance system, the operator typically reviews video based upon some alarm, event or manual bookmark, etc. The operator selects the portion of the video data for forensic operations (video data in such cases is often used for evidentiary purposes). Typically, selected video will be exported as a video clip for further reference.

Most conventional systems offer a preview option for recorded videos to select the intended portion of the recordings. For example, a conventional recording system will divide a full day's recorded video from a camera into 24 clips of 60 minutes each. Some conventional recording systems also allow a user the option of further drilling down to an hourly level including 6 clips of 10 minutes each.

Most of these clips are displayed as thumbnail images so that the user can pick the intended clip. The thumbnail is typically the first frame of the clip.

The difficulty with conventional systems is that the user does not have any idea about the activities in each 10 minute clip unless it is played or the user has drilled down further to show further thumbnails of the video. Whenever a video clip is exported as proof/evidence by an investigator or CCTV operator, the video data will not normally be self-explanatory. To correct this situation, a user may annotate a voice message over the video explaining the significance of the video.

In contrast, the system of FIG. 1 creates a virtual panoramic thumbnail of the selected video contents from the recorders. For example, the user, guard or other operator may select a view video option to view and select video from the video recorder for clip export. The processors of the system may operate in the background in real time to create virtual panoramic thumbnail images for each clip or the system may create the images in response the selection of specific frames by the operator.

Figure 2:
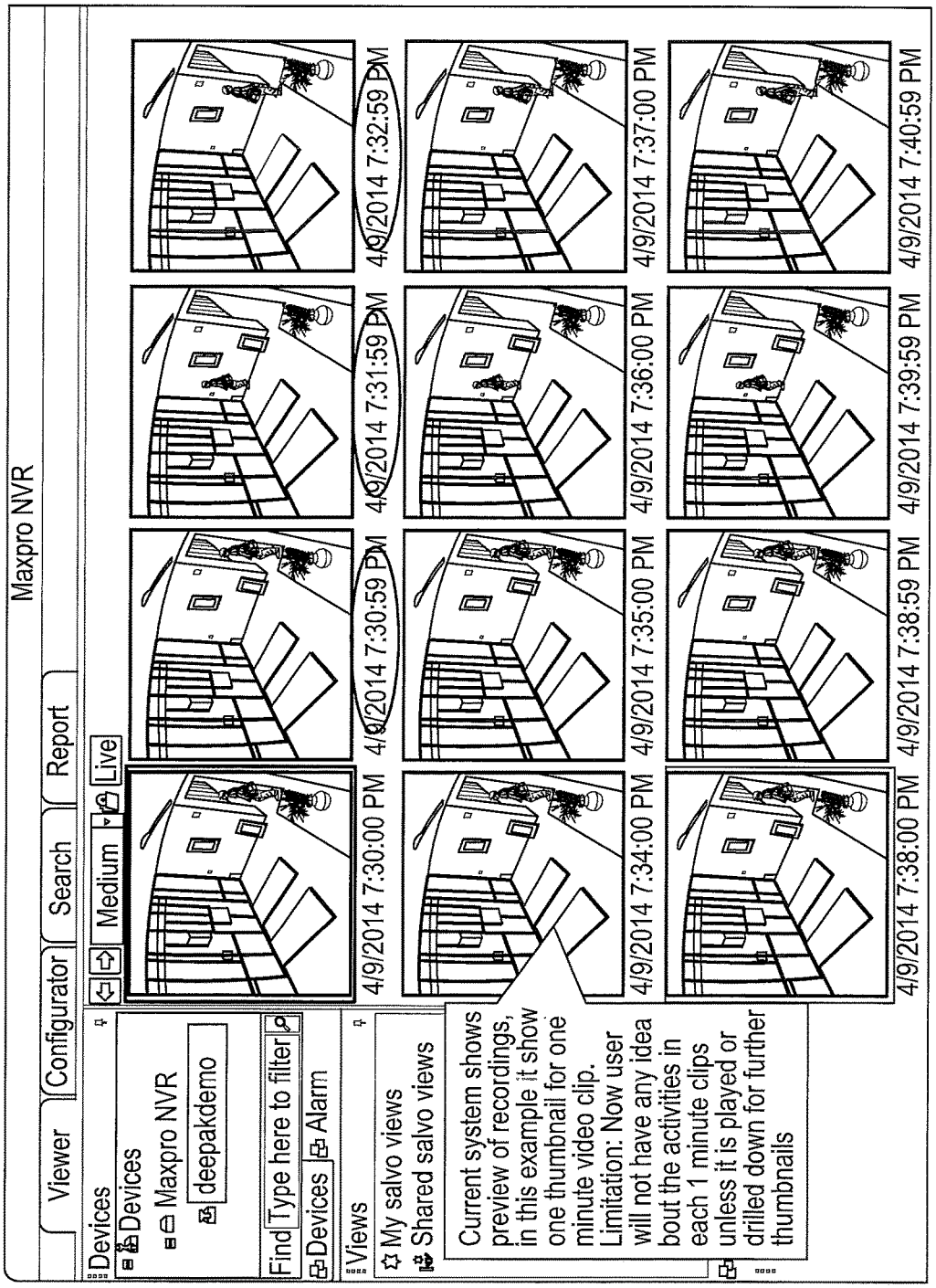
FIG. 2 depicts a sequence of images that may be processed by the system of FIG. 1.

FIG. 2 shows a conventional video clip selected by the operator. In this case, only one frame of video (the first frame) would be used as the thumbnail image. The reviewer would not have any idea about the activity shown in this clip unless he/she drilled down in order to observe more detail.

In the case of FIG. 2, the system would identify the large object or a person in the field of view (FOV). The object would be the person that enters from the hallway (center-right). The system would start tracking the object for a predetermined time period (e.g., one minute, five minutes, etc.). The system identifies a set of frames from the one minute clip based on the movement and overall size of the object in the field of view.

As may be observed, FIG. 2 shows a person entering from the hallway to the right and approaching the doors a total of three times before exiting through the hallway to the right. In this case, the system would identify the three images on the top row (with the circled time indicators) as the summarizing images that are used to characterize the clip. This is because the second and third rows of images in FIG. 2 are merely repetitive motion.

Figure 3:
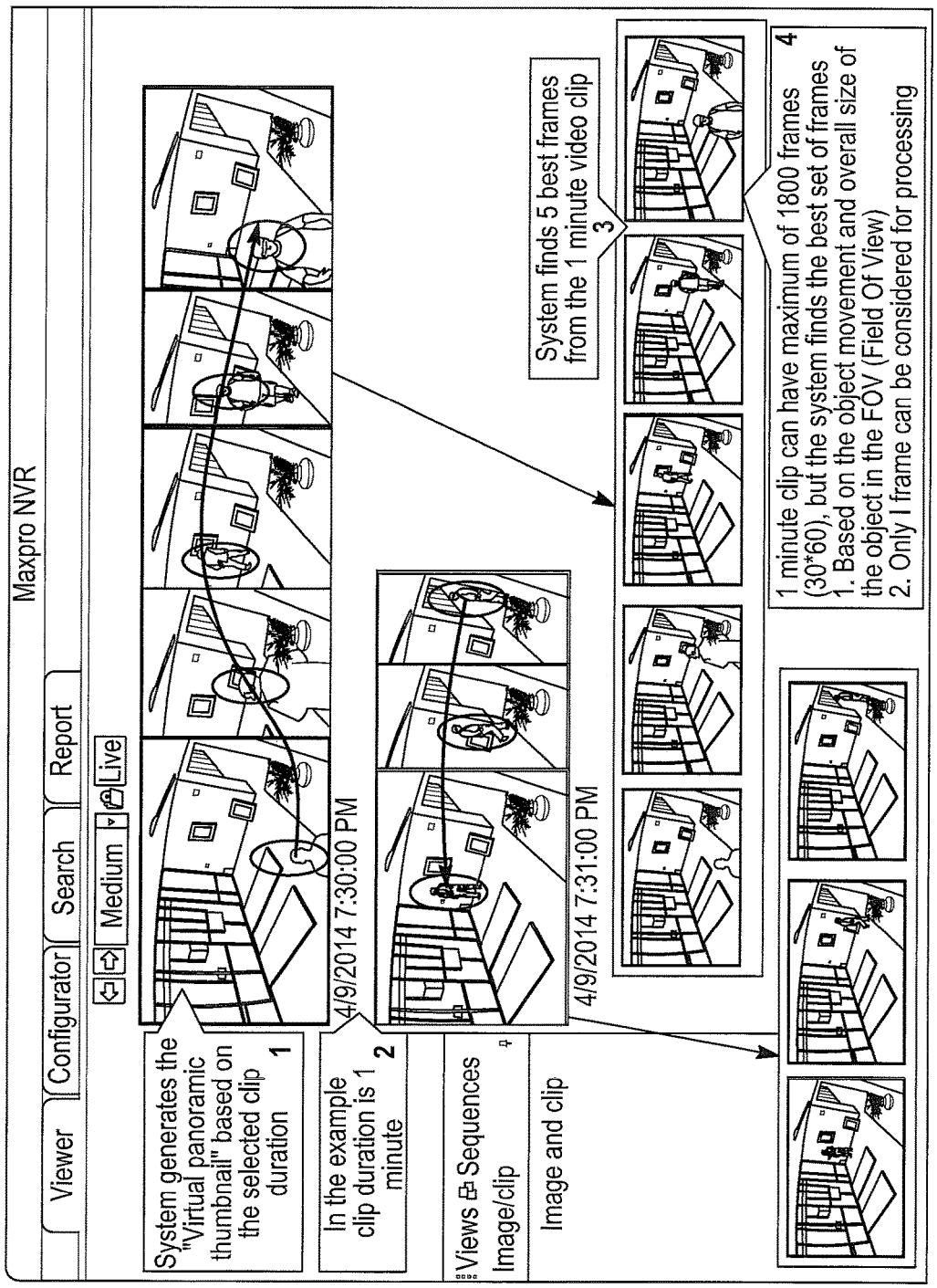
FIG. 3 depicts the selection of images for combining into a thumbnail image.
Figure 4:
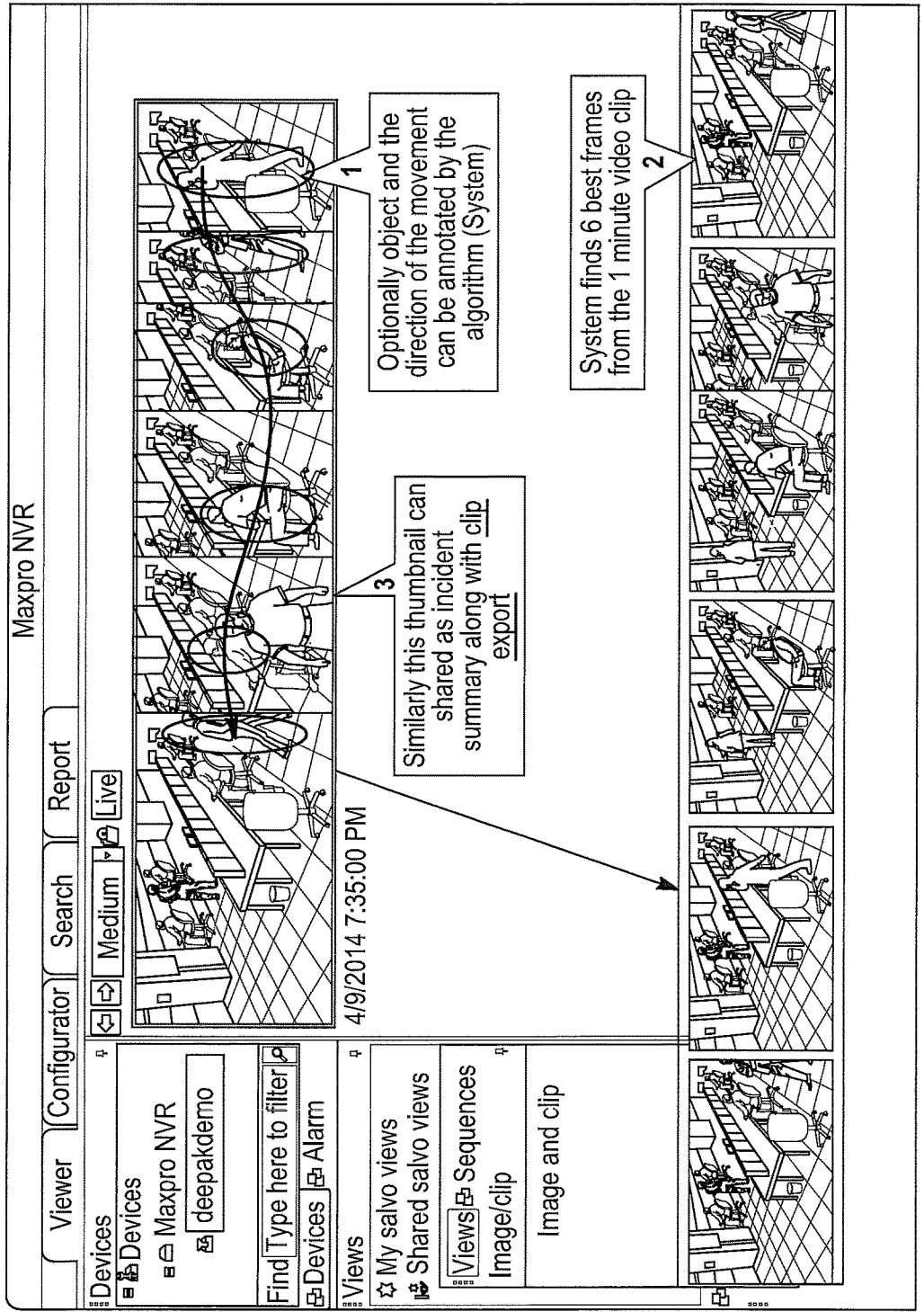
FIG. 4 depicts further details of combining images.

The system may only use I frames (and not B or P frames) to identify images that characterize the clip. The set of frames are used to generate one virtual panoramic thumbnail image as shown in FIG. 3. The object and direction of movement can be annotated graphically by the system in the generated virtual panoramic thumbnail shown at the top of FIG. 3. In this case, the system connects the moving object with a line that connects the object among the images as shown at the top of FIGS. 3 and 4. The system then selects the five or six best frames to create the thumbnail image.

In the case of multiple moving objects in the FOV, multiple thumbnails images can be generated for the same video clip. Alternatively, only one large moving object can be selected by the system.

As noted above, the system may create the thumbnail image in the background for all the saved recorded clips and can create a graphically indexed thumbnail (i.e., the virtual panoramic thumbnail). This is done to reduce the retrieval time.

Figure 5:
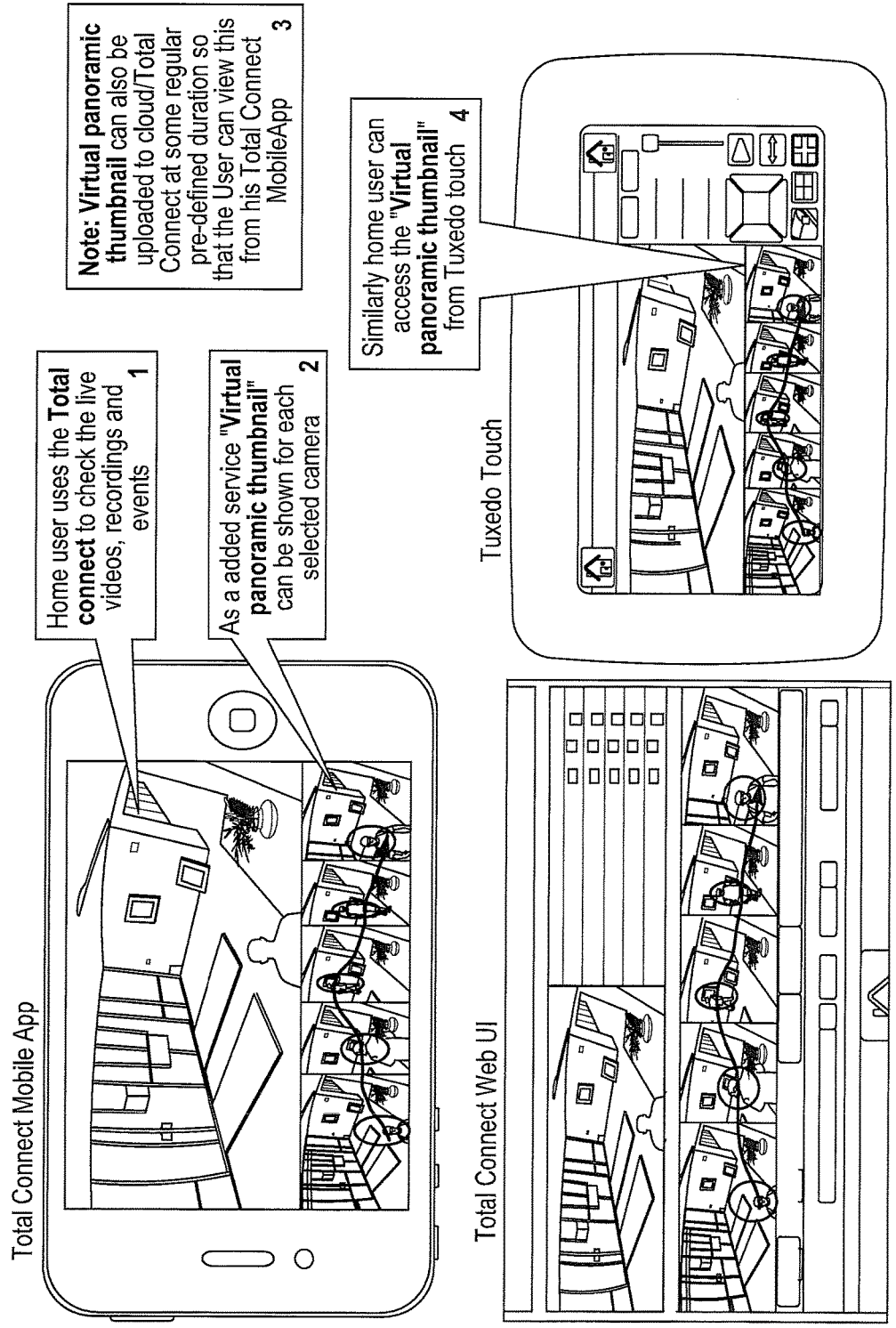
FIG. 5 depicts a thumbnail images of combined frames.

FIG. 5 shows an example (on the top left side) of the identified frames having been compressed into a thumbnail image. As shown, the detected moving object can be identified by a circle superimposed over the moving object or person.

In general, the virtual panoramic thumbnail image can be shared as evidence of the content of the video clip. Selection of the thumbnail image can be used to play the video as needed.

Virtual panoramic thumbnail images can be created for any size video clip. They can be created for one minute clips, ten minute clips as well as clips of one hour or longer.

The use of the virtual panoramic thumbnail images are not restricted to only selected video timeframes, but can be extended by the system to include further time frames based on the movement in the FOV or until the object/person leaves the field of view. This can be performed by the system with the system presenting a message on the display window that notifies the user that the tracked object has been tracked outside of the selected time frame.

Optionally, face recognition and person identification based upon face detection routines can be used to tag the tracked person. Once identified, the tracked person's name can be superimposed on the video for forensic purposes.

Privacy zones and trip wires can also be used in conjunction with the identified video clips. In this case, if a person has entered a privacy zone or crossed a trip wire, those frames can be highlighted in the panoramic view.

The virtual panoramic thumbnail images can be useful for intrusion detection. For example, when a user returns home from his/her office or from a long vacation, he/she can retrieve a panoramic view of all of the major alarms/events captured by the motion sensors. Panoramic views can be displayed on a portable wireless interface or the UI.

In general, the system includes a video sequence embodied in memory, a processor that detects a moving object or person within a field of view of the video sequence, a processor that tracks the moving object or person and that identifies a plurality of frames that summarizes movement of the moving object or person within a time interval of the video sequence and a processor that combines the identified plurality of frames into a thumbnail image.

Alternatively, the system includes a security system that protects a secured area, a video sequence of images from the secured area embodied in memory, a processor that detects a moving object or person within a field of view of the video sequence, a processor that identifies a plurality of frames of the video sequence that summarizes movement of the moving object or person within a time interval of the video sequence and a processor that combines the identified plurality of frames into a thumbnail image.

Alternatively, the system includes a security system that protects a secured area, a camera of the security system that collects a sequence of images from the secured area, a processor that detects a moving object or person within the sequence of images, a processor that identifies a plurality of frames of the sequence that summarizes movement of the moving object or person within a time interval of the video sequence and a processor that combines the identified plurality of frames in chronological order into a thumbnail image From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. An apparatus comprising:
    a memory that stores a video sequence comprising a plurality of frames; and
    a processor that detects a moving object within a field of view of the video sequence,
    wherein the processor tracks the moving object and identifies a first subset of the plurality of frames that includes the moving object,
    wherein the processor identifies a second subset of the first subset of the plurality of frames that summarizes movement of the moving object within a time interval of the video sequence,
    wherein the second subset of the first subset of the plurality of frames comprises two or more non-consecutive frames of the first subset of the plurality of frames that summarizes the movement of the moving object within the time interval of the video sequence, and
    wherein the processor combines the second subset of the first subset of the plurality of frames into a virtual panoramic thumbnail image that is a single image with the two or more non-consecutive frames of the first subset of the plurality of frames simultaneously displayed adjacent to one another in the single image across a user interface.

2. The apparatus as in claim 1 wherein the virtual panoramic thumbnail image comprises the second subset of the first subset of the plurality of frames arranged in chronological order.

3. The apparatus as in claim 2 further comprising a line that joins the moving object across the second subset of the first subset of the plurality of frames.

4. The apparatus as in claim 1 wherein the processor compares a size of the moving object with a threshold value.

5. The apparatus as in claim 1 wherein the processor compares a speed of the moving object with a threshold value.

6. The apparatus as in claim 1 wherein the memory stores a file that includes the virtual panoramic thumbnail image and a video clip.

7. The apparatus as in claim 1 further comprising a security system that collects the video sequence and stores the video sequence in the memory.

8. The apparatus as in claim 7 wherein the security system comprises a camera and a sensor that triggers the camera to record the video sequence.

9. An apparatus comprising:
    a security system that protects a secured area;
    a memory that stores a video sequence of images comprising a plurality of frames from the secured area; and
    a processor that detects a moving object within a field of view of the video sequence,
    wherein the processor identifies a first subset of the plurality of frames of the video sequence that includes the moving object,
    wherein the processor identifies a second subset of the first subset of the plurality of frames that summarizes movement of the moving object within a time interval of the video sequence,
    wherein the second subset of the first subset of the plurality of frames comprises two or more non-consecutive frames of the first subset of the plurality of frames that summarizes the movement of the moving object within the time interval of the video sequence, and
    wherein the processor combines the second subset of the first subset of the plurality of frames into a virtual panoramic thumbnail image that is a single image with the two or more non-consecutive frames of the first subset of the plurality of frames simultaneously displayed adjacent one another in the single image across a user interface.

10. The apparatus as in claim 9 wherein the processor compresses the second subset of the first subset of the plurality of frames of the virtual panoramic thumbnail image to fit within the single image.

11. The apparatus as in claim 9 wherein the processor saves the video sequence and the virtual panoramic thumbnail image into a file.

12. The apparatus as in claim 11 wherein the processor displays the virtual panoramic thumbnail image as an identifier of the file.

13. The apparatus as in claim 9 wherein the second subset of the first subset of the plurality of frames of the virtual panoramic thumbnail image comprises a horizontal array of images in chronological order.

14. The apparatus as in claim 13 wherein the horizontal array of images comprises a line across the horizontal array of images that connects the moving object.

15. An apparatus comprising:
a security system that protects a secured area;
a camera of the security system that collects a sequence of images comprising a plurality of frames from the secured area; and
a processor that detects a moving object within the sequence of images,
wherein the processor identifies a first subset of the plurality of frames of the sequence of images that includes the moving object,
wherein the processor identifies a second subset of the first subset of the plurality of frames that summarizes movement of the moving object within a time interval of the sequence of images,
wherein the second subset of the first subset of the plurality of frames comprises two or more non-consecutive frames of the first subset of the plurality of frames that summarizes the movement of the moving object within the time interval of the sequence of images, and
wherein the processor combines the second subset of the first subset of the plurality of frames in chronological order into a virtual panoramic thumbnail image that is a single image with the two or more non-consecutive frames of the first subset of the plurality of frames simultaneously displayed adjacent one another in the single image across a user interface.

* * * * *